United States Patent [19]
Economy et al.

[11] 3,716,521
[45] Feb. 13, 1973

[54] ETHERIFIED OR ESTERIFIED PHENOLIC RESIN FIBERS AND PRODUCTION THEREOF

[75] Inventors: James Economy, Eggertsville; Francis J. Frechette, Tonawanda; Luis C. Wohrer, Lewiston, all of N.Y.

[73] Assignee: The Carborundum Company, Niagara Falls, N.Y.

[22] Filed: March 31, 1971

[21] Appl. No.: 130,017

[52] U.S. Cl.............260/59, 8/115.5, 57/140 R, 161/172, 264/176 F, 260/51 R
[51] Int. Cl. ...............................C08g 5/18
[58] Field of Search..................260/59, 57 A

[56] References Cited

UNITED STATES PATENTS

| | | |
|---|---|---|
| 2,091,965 | 9/1937 | Cherry ....................260/59 |
| 2,101,642 | 12/1937 | Elbel et al. ...............260/59 |
| 2,212,509 | 8/1940 | Cherry ....................260/59 |
| 2,259,503 | 10/1941 | Wassenegger...........260/59 X |
| 2,470,130 | 5/1949 | Bender....................260/59 X |
| 2,840,542 | 6/1958 | Freeman et al..........260/59 X |

OTHER PUBLICATIONS

Chem. Abstracts, Vol. 72, 1970, 80229 F, Economy et al.

*Primary Examiner*—Howard E. Schain
*Attorney*—David E. Dougherty and Peter P. Eichler

[57] ABSTRACT

Infusible cured phenolic resin fibers are reacted with a suitable reagent to block at least about 50 percent of the phenolic hydroxyl groups of the cured resin by esterification or etherification, whereby infusible cured phenolic resin fibers are obtained which have improved oxidation resistance and colorfastness and which are white.

24 Claims, No Drawings

ETHERIFIED OR ESTERIFIED PHENOLIC RESIN FIBERS AND PRODUCTION THEREOF

BACKGROUND OF THE INVENTION

The present invention relates to phenolic resin fibers, and more particularly to infusible cured phenolic resin fibers having improved oxidation resistance and colorfastness and to a method for their production.

Phenolic resins are too well-known in the art to require more than a very brief description here. Extensive discussions of phenolic resins may be found, for example, in A.A.K. Whitehouse et al., *Phenolic Resins*, American Elsevier Publ. Co., Inc., New York (1968), and Gould, *Phenolic Resins*, Reinhold Publ. Corp., New York (1959).

Phenolic resins are produced by the condensation of a phenol and an aldehyde. The phenol employed is most commonly phenol itself, but any of a wide variety of phenols as well as mixtures thereof may be used, such as phenol which is substituted in the ortho, meta, and/or para position, provided that sufficient ortho and para positions are unsubstituted to permit condensation and cross-linking. Similarly, various aldehydes have been employed, formaldehyde being by far the most commonly used. Accordingly, many different varieties of phenolic resins are commercially available.

Phenolic resins are generally classified as either resoles or novolacs. Resoles are ordinarily prepared by carrying out the condensation with a molar excess of the aldehyde and in the presence of an alkaline catalyst. Resoles are characterized by the presence therein of methylol groups, which render it possible to effect curing and cross-linking via methylene linkages by heat alone. Novolacs are usually prepared by employing an acid catalyst and a slight molar excess of the phenol. Novolacs are characterized by the absence of methylol groups, and accordingly, they cannot be cured and cross-linked by heat alone, additionally requiring the presence of a source of methylene groups and preferably a suitable catalyst.

Infusible cured phenolic resin fibers are a comparatively recent development in the history of phenolic resins. They are ordinarily produced by fiberizing a melt of a phenolic resin, as by melt spinning or by blowing (i.e., allowing a thin stream of the melt to fall into the path of a blast of air which fiberizes the stream), to obtain fusible uncured phenolic resin fibers which are subsequently treated to cure, or cross-link, the resin at least to the point of infusibility. When the phenolic resin selected is a resole, such curing is effected merely by heating. When the phenolic resin selected is a novolac, curing is effected by heating in the presence of a source of methylene groups such as hexamethylenetetramine, paraformaldehyde or formaldehyde, and preferably also in the presence of an acidic or basic catalyst, hexamethylenetetramine being rather unique in being able to serve as both a methylene group source and a basic catalyst. A particularly desirable method for the preparation of infusible cured novolac fibers is described in U.S. patent application Ser. No. 710,292, now U.S Pat. No. 3,650,102, filed Mar. 4, 1968 by James Economy et al, which is commonly assigned with the present application, and the disclosure of which is incorporated herein by reference. Fibers may also be prepared from mixtures of resoles and novolacs in any desired proportions, the curing conditions employed being selected with regard to the proportions. Additives and modifiers, either reactive or nonreactive, may be incorporated in the phenolic resin to alter its fiberization characteristics and/or the properties of the fibers.

Infusible cured phenolic resin fibers have a number of highly desirable properties which render them of value in numerous applications. Perhaps their most important virtue is their outstanding flame resistance. When subjected to a flame, the fibers, being infusible, do not melt, but rather char to produce carbon fibers which continue to retain the shape and approximate dimensions of the original fibers and which continue to afford extremely effective protection from flames. Accordingly, the fibers are of great utility in the fabrication of flame protective clothing, as well as drapes, carpeting, upholstery and the like which are especially suited to use in areas where fire constitutes a particular hazard. Such fibers also provide very effective thermal and acoustical insulation, and again, they are particularly useful in these applications in areas where fire is a hazard. The fibers have suitable mechanical properties such as tenacity and break elongation to permit their being processed into yarns, woven and knitted fabrics and the like, as well as various non-woven forms such as felt, batting and paper.

Not withstanding their desirable attributes, infusible cured phenolic resin fibers have several serious disadvantages. They are somewhat susceptible to oxidation, particularly at elevated temperatures. Just after curing, they are generally quite intensely colored, the hue ranging from fairly deep pink to red, sometimes with a somewhat orange cast. Moreover, upon standing, particularly if exposed to light and air, the coloration increases considerably in intensity, becoming deep orange, orange-red or brownish-red; i.e., the fibers possess rather poor colorfastness. While such intensely colored fibers may be dyed to very dark shades, it is impossible to dye them in lighter or pastel hues, having a marked detrimental effect upon their acceptance by the textile industry and the consumer with respect to applications for the fibers in which color is an important factor.

SUMMARY OF THE INVENTION

In accordance with the present invention, infusible cured phenolic resin fibers may be produced which are markedly improved with respect to the above-mentioned disadvantages, while still retaining outstanding flame resistance and suitable mechanical properties to permit textile processing. The fibers of the invention possess substantially improved oxidation resistance as compared to the hitherto known infusible cured phenolic resin fibers from which they are prepared, as well as markedly superior colorfastness, i.e., a markedly reduced tendency to darken in color, especially upon exposure to light and air. Also, according to the invention, such fibers with improved oxidation resistance and colorfastness may be produced which are white, permitting them to be dyed to any desired hue. Moreover, such white fibers, to the limited extent that they may slowly darken with age and exposure, tend to turn off-white or tan rather than deep orange, orange-red or brownish-red, thus they still may be dyed in a wide variety of hues.

The improved fibers of the invention are infusible cured phenolic resin fibers wherein at least about 50 percent, and preferably at least about 90 percent, of the phenolic hydroxyl groups of the cured resin are blocked by etherification or, preferably, esterification. Preferably, the blocking of the phenolic hydroxyl groups is accomplished by replacement of the hydrogen atoms thereof with blocking groups which are monovalent radicals having the formula R— or

R preferably being selected from the group consisting of lower alkyl; lower alkyl wherein one or more hydrogen atoms are replaced by halogen such as fluorine, bromine and chlorine; phenyl; and phenyl wherein one or more hydrogen atoms are replaced by halogen and/or lower alkyl. The term "lower" as used herein with reference to alkyl, acyl and the like refers to a carbon atom content of from 1 to 6. Preferably R is lower alkyl, and the fewer carbon atoms the better, methyl being especially preferred. At least about 50 percent of the phenolic hydroxyl groups must be blocked in order to achieve a significant improvement in oxidation resistance and colorfastness and to obtain white fibers, and in general, oxidation resistance, colorfastness and whiteness tend to improve as the extent of blocking is increased. Maximum improvement is obtained by blocking 90 percent or more of the groups, such fibers being extremely colorfast and highly oxidation resistant.

The improved fibers are produced in accordance with the method of the invention which comprises reacting infusible cured phenolic resin fibers with any of a wide variety of suitable esterification or etherification reagents at a temperature and for a time sufficient to block at least about 50 percent, and preferably at least about 90 percent, of the phenolic hydroxyl groups of the cured resin by esterification or etherification. Thereby, the oxidation resistance and color-fastness of the fibers is unexpectedly improved, and the resulting fibers are ordinarily white, appearing transparent under microscopic examination. At the same time, the esterification or etherification does not seriously impair the flame resistance of the fibers, although it may reduce it somewhat; nor does it adversely affect their tenacity or break elongation. Indeed, the break elongation may even be improved in some cases, as is seen in Example 1.

According to the invention, it has unexpectedly been found possible to accomplish the blocking of phenolic resins in fiber form after the resin has been cured to the point of infusibility, notwithstanding the cross-linked structure of the cured resin. However, it has proven unfeasible first to block the phenolic resin and subsequently to cure the resin in fiber form, since curing of the blocked resin either cannot be accomplished at all or proceeds so slowly as to be impractical.

DESCRIPTION OF PREFERRED EMBODIMENTS

Particularly suitable reactants to esterify the phenolic hydroxyl groups include anhydrides of carboxylic acids, acylation with anhydrides of lower alkanoic acids being preferred, especially acetylation with acetic anhydride. Acid halides are also particularly suitable, the chlorides generally being less expensive and therefore preferred, lower alkyl acid halides again being preferred, especially acetyl chloride. Particularly suitable reagents to etherify the phenolic hydroxyl groups are diethyl sulfate and dimethyl sulfate, methylation with the latter being preferred to other lower alkylation. Since the acid anhydrides and acid chlorides are generally considerably less expensive than the various useful etherification reagents, esterification is generally preferred to etherification.

The selected reactant may be a liquid, a solid, or a gas or vapor, and suitable reaction conditions will be chosen accordingly. In most cases, the reaction is best carried out in a liquid environment, a suitable solvent being employed for gaseous or solid reactants, although some reactants such as acetyl chloride may be employed in the gaseous or vapor state. Most conveniently, the starting infusible cured phenolic resin fibers are simply immersed in a liquid which comprises the reactant, at a temperature and for a time sufficient to effect the esterification or etherification to the desired extent.

The extent of blocking, i.e., the percentage of the phenolic hydroxyl groups of the cured resin which are blocked by etherification or esterification, may be ascertained most simply by comparing the actual weight gain of the fibers upon esterification or etherification with the theoretical weight gain expected if all of the phenolic hydroxyl groups were esterified or etherified with the reactant employed. The extent of blocking by esterification may also be determined by saponification and titration of the acid liberated thereby.

The time required to effect the required extent of blocking depends upon a number of factors, and may vary from as little as a minute or less to as much as 100 hours. Ordinarily, the higher the temperature, the less time required. Practical reaction times may be achieved at temperatures as low as room temperature or below with certain reactants, whereas other reactants may require temperatures as high as about 200°C, most reagents preferably being employed at temperatures between these extremes. Although increasing the reaction temperature may reduce the amount of time required, it may also tend to favor the rate of side reactions, which in turn may tend to impart undesirable coloration to the fibers, thus unnecessarily high temperatures should be avoided and an optimum balance between temperature and time employed.

The required reaction time also depends to some extent upon the molecular size and weight of the selected reagent, since the smaller the molecule, the more rapidly it may penetrate into and diffuse throughout the fibers to react with the hydroxyl groups. Accordingly, the lower molecular weight reactants are preferred, acetylation of the hydroxyl groups with acetic anhydride being especially preferred, as is also methylation of the hydroxyl groups with dimethyl sulfate. While higher molecular weight reactants may be employed, higher molecular weight blocking groups provided thereby do not appear to offer any advantage over acetyl and methyl groups insofar as improvement of the properties of the fibers is concerned. It is preferred to employ at least a stoichiometric amount of the reactant, and still more preferable to employ a stoichiometric excess, to favor a greater extent of blocking.

The required reaction time also tends to increase with increasing thickness of the cured phenolic resin fibers, which tends to increase the time required for any given reagent to diffuse throughout the fiber to react. For this reason, among others, it is preferred that the starting cured resin fibers have a maximum diameter of about 30 microns, although much thicker fibers up to several hundred microns in diameter and more may be successfully employed.

Catalytic amounts of known esterification or etherification catalysts may be employed, if desired, and may serve to accelerate the reaction rate. Particularly effective as acetylation catalysts are various mineral acids, especially sulfuric acid, and various mild bases such as pyridine.

The time required to achieve a given extent of blocking is also dependent upon the cross-link density of the cured phenolic resin in the starting fibers, i.e., the extent or degree of cross-linking in the cured resin, which is a function of the extent or degree of curing. This factor cannot be measured or expressed in absolute terms but it may be considered in a relative manner. In general, the higher the cross-link density, i.e., the greater the extent of cross-linking, the longer the time required to achieve a given extent of blocking. When the resin is just barely cured to the point at which the fibers become infusible, the resin reacts extremely rapidly to produce white fibers having improved oxidation resistance and colorfastness, but such fibers, having a relatively low cross-link density, usually have an inferior break elongation; see Example 5. Conversely, overly extensive curing results in such a relatively high cross-link density that penetration and diffusion of the reagent is retarded and a slower reaction results, while at the same time such extensive curing does not result in any greater tenacity or break elongation that somewhat less extensive curing which is more favorable to blocking, and accordingly, unnecessarily high cross-link densities are generally disadvantageous; see Example 6. Therefore, it is preferred to cure to the approximate optimum extent of cross-linking which will impart suitable mechanical properties to the fibers but which will also permit fairly rapid blocking to produce white fibers with improved oxidation resistance and colorfastness, as in Examples 1–4, wherein the cured resin fibers have moderate, intermediate cross-link densities.

For purposes of the present invention, infusible cured novolac fibers are very much preferred over other types of infusible cured phenolic resin fibers, not only because it has proven to be somewhat easier to cure novolacs than resoles in fibrous form but also because it is somewhat easier to control the extent of curing and cross-linking.

Although highly cross-linked phenolic resin fibers may often be suitably treated with a blocking reactant by increasing the reaction time, the additional time is undesirable from a commercial standpoint, and it also increases the possibility of side reactions which may tend to result in discoloration of the resulting fibers. A highly advantageous expedient, especially for fibers wherein the phenolic resin is very highly cross-linked and sometimes even when the cross-link density is only moderate, is to treat the fibers with an organic liquid capable of diffusing into and swelling the fibers, whereby their volume is increased and their cross-linked network is expanded, thus permitting more rapid penetration and diffusion of the reagent. Suitable organic liquids, herein termed liquid swelling agents, include various highly polar liquids, and the greater their polarity, the more swelling they effect. Accordingly, such very highly polar liquids as dimethylacetamide and dimethylformamide are especially preferred, dimethylsulfoxide being somewhat less effective. If the liquid swelling agent does not react with the reactant or prevent the reaction thereof with the resin, it may be combined with the reactant and the fibers immersed in the mixture so that swelling and blocking may be carried out in one step, as in Example 1. Alternatively the fibers may first be immersed in the liquid swelling agent to effect swelling, the swelled fibers subsequently being treated with the reactant, as in Example 3.

If the selected reactant is a liquid at the desired reaction temperature, the fibers to be treated may simply be immersed therein for the required length of time. If the reactant is a solid at the desired reaction temperature, it must be dissolved in a suitable inert liquid. The term "inert" as used herein with reference to such liquids indicates that they do not react chemically with the reactant or with the resin nor prevent the desired reaction between them. The inert liquid, if of high polarity, may also serve as a liquid swelling agent, or it may be selected from among numerous liquids of lower polarity which do not effect any significant swelling. Optionally, such an inert liquid may be employed as a diluent for liquid reactants, with or without an additional liquid swelling agent, the use of an inert liquid diluent in some such instances having been found to result in slightly whiter fibers.

The invention will be further described partly with reference to the following examples, which are intended to illustrate, and not to limit the scope of, the invention.

EXAMPLE 1

A novolac is prepared conventionally by condensing formaldehyde with a slight molar excess of phenol in the presence of a catalytic amount of oxalic acid. After purification to remove any particulate impurities and residual phenol, the resin has an average molecular weight of about 720 and a viscosity at 150°C of about 41,300 cps. The resin is fiberized, i.e., formed into fibers, by melt spinning, a plurality of filaments being simultaneously drawn from a melt at 135°C through a bushing having about 1,000 orifices of 1.78 mm. inner diameter, at a rate of 760 m./minute. The white, fusible, uncured novolac fibers have an average diameter of 12 microns.

250 g. of the fibers are immersed in 2 l. of an aqueous solution containing 18% paraformaldehyde as a source of methylene groups and 18% paraformaldehyde as a source of methylene groups and 18% HCl as a catalyst, at room temperature (about 25°C). The solution is heated to 30°C over a period of 1 hour, then to 40°C over a period of 1 hour, then 70°C over a period of 1 hour, then to the boiling point (103°C) over a period of 30 minutes, and the temperature is held at the boiling point for 1 hour, whereupon the fibers are removed, washed with water, and dried in air at about 60°C. The resulting infusible cured novolac fibers are rather deep reddish-pink. They have an average tenacity of about 1.7 g./denier and a break elongation ranging from about 5 percent to about 40 percent and averaging about 25 percent.

A mixture of 1 l. of acetic anhydride, 1 l. of dimethylacetamide, 1 l. of tetrachloroethylene and 1 ml. of 98% sulfuric acid as a catalyst is heated to the boiling point, about 120°C. While maintaining the solution at the boiling point, 224 g. of the cured novolac fibers are immersed therein for 10 minutes. The fibers are then removed, allowed to cool somewhat, washed with acetone and then with water, and dried in air at about 60°C. A yield of 275 g. of fibers is obtained, representing a weight gain of 23 percent, indicating that at least about 59 percent of the phenolic hydroxyl groups of the phenolic resin are blocked by esterification, more particularly acetylation. The fibers are white, appear transparent under microscopic examination, and have an average diameter of 13 microns, a slight increase over the average diameter of the starting uncured and cured novolac fibers. The fibers have approximately the same average tenacity as the starting cured novolac fibers, but their break elongation is increased, ranging from about 20 percent to about 40 percent and averaging about 35 percent.

Samples of the cured novolac fibers before and after esterification are placed outdoors, exposed to all prevailing climatic conditions including sunlight. After 6 months, the esterified phenolic resin fibers are still white, whereas the unesterified resin fibers have darkened considerably to deep brownish-red, evidencing the superior colorfastness of the esterified resin fibers.

10 g. of the cured but unesterified novolac fibers are compressed into a dense ball about 4 cm. in diameter, which is placed in a hot air oven at about 150°C. Within 15–30 minutes, the fibers in the center of the ball begin to smolder and char due to oxidation. The test is repeated with the esterified novolac fibers and it is found that a temperature of about 200°C is required to cause such smoldering and charring within the same length of time, thus evidencing their superior oxidation resistance.

As may be seen from Example 1, infusible cured phenolic resin fibers which have been cured to approximately the optimum extent possess quite satisfactory tenacity and break elongation as well as permitting of quite rapid esterification. The esterified resin fibers have a slightly larger diameter than the unesterified resin fibers from which they are made, as is usually the case, presumably as a result of the larger volume of the blocking groups as compared to the volume of the hydrogen atoms which they replace. It will be noted that, in addition to dimethylacetamide as a liquid swelling agent, tetrachloroethylene is also employed as an inert liquid diluent. Other inert liquid diluents such as xylene, nitrobenzene, decalin and tetralin, among others, are equally useful. Acetylation with acetic anhydride is preferably carried out at a temperature of at least about 100°C to achieve a practical reaction rate.

Example 2 illustrates the greater extent of esterification which may be achieved by increasing the reaction time somewhat, and greater improvements obtained by blocking more than 90 percent of the phenolic hydroxyl groups.

EXAMPLE 2

Cured, esterified novolac fibers are produced as in Example 1, except that the fibers are kept in the boiling acetylating mixture of acetic anhydride, dimethylacetamide, tetrachloroethylene and sulfuric acid for 30 minutes instead of 10 minutes. A weight increase of 36 percent upon esterification is observed, indicating that about 92 percent of the phenolic hydroxyl groups are blocked. The resulting white fibers possess even greater colorfastness and oxidation resistance than the esterified phenolic resin fibers of Example 1, and when subjected to the oxidation test described in Example 1, it is found that no smoldering or charring occurs within 16 hours at 220°C. The fibers have approximately the same tenacity and break elongation as the esterified resin fibers of Example 1.

Example 3 illustrates the decreased time required for substantially complete esterification as a result of increasing the reaction temperature.

Example 3

Uncured novolac fibers produced as in Example 1 are immersed at room temperature in 1 l. of an aqueous solution containing 18% HCl and 18.5% formaldehyde. The temperature of the solution is brought to 40°C, then increased gradually to 60°C over a period of 3 hours, and finally increased to 100°C over a period of 1 hour. The fibers are removed, washed with water, and dried in air at about 60°C.

25 g. of the resulting pink infusible cured novolac fibers are immersed in boiling dimethylacetamide for 1 minute to swell them. The fibers are removed, drained, and washed in boiling acetone and then in hot nitrobenzene to remove the excess dimethylacetamide. The swelled fibers are then immersed for 2 minutes in a boiling (about 150°C) mixture of 200 ml. of acetic anhydride, 200 ml. of nitrobenzene as an inert diluent, and 0.5 ml. of 98% sulfuric acid. The fibers are removed, allowed to cool, washed several times with warm acetone, and air dried at about 60°C.

A yield of 35 g. of esterified phenolic resin fibers is obtained, representing a weight increase of 40%, indicating that blocking of substantially all of the phenolic hydroxyl groups has occurred. The white fibers have approximately the same colorfastness, oxidation resistance, tenacity and break elongation as the esterified phenolic resin fibers of Example 2.

EXAMPLE 4

2.5 g. of cured novolac fibers produced as in Example 1 are immersed for 10 minutes in 150 ml. of boiling (about 138°C) acetic anhydride containing 0.1 ml. of 98% sulfuric acid. The fibers are removed, allowed to cool, washed with acetone, and dried in air at about 60°C. A yield of 3.4 g. of fibers is obtained, representing a weight increase of 36% upon esterification, indicating that about 92% of the phenolic hydroxyl groups of the resin are blocked. The fibers are white, although not quite as light as the esterified phenolic resin fibers produced in Examples 1–3 and 5. They possess approximately the same colorfastness, oxidation resistance, tenacity and break elongation as the esterified phenolic resin fibers of Example 2.

A comparison of Example 4 with Examples 1 and 2 indicates that the liquid swelling agent and the inert liquid diluent employed in Examples 1 and 2 are optional with respect to improving the oxidation resistance and colorfastness of moderately cross-linked phenolic resin fibers, although either or both may offer some advantage in respect of the lightness of the resulting white fibers. But as shown by Example 5, they apparently offer no significant advantage as to relatively low cross-link density fibers, which, however, may suffer the disadvantage of a relatively low break elongation.

EXAMPLE 5

475 g. of uncured novolac fibers produced as in Example 1 are subjected to curing as set forth in Example 1, but about half of the fibers are withdrawn from the boiling HCl-formaldehyde solution after only 15 minutes instead of 1 hour, to obtain infusible cured novolac fibers which have a relatively low cross-link density. The remaining half of the fibers are permitted to remain in the boiling curing solution for 4 hours instead of 1 hour, to obtain infusible cured novolac fibers having a relatively high Cross-link density. Both portions of the fibers are washed with water upon removal from the curing solution and dried in air at about 60°C.

The low cross-link density fibers are rather deep reddish-pink. As compared to the cured, unesterified phenolic resin fibers of Example 1, they have approximately the same average tenacity but a considerably lower average break elongation. A portion of the fibers is immersed for 3 minutes in boiling (about 138°C) acetic anhydride containing a catalytic amount of sulfuric acid. The fibers are removed, washed with ethyl acetate, then with acetone, and dried in air at about 60°C. The resulting esterified phenolic resin fibers are white.

Example 6

The high cross-link density fibers produced in Example 5 are quite deep orange-pink. They possess approximately the same average tenacity and average break elongation as the cured, unesterified phenolic resin fibers of Example 1. A 2.8 g. portion of the fibers is immersed for 15 minutes in 150 ml. of boiling (about 138°C) acetic anhydride containing 0.1 ml. of 98% sulfuric acid. The fibers are removed, washed with ethyl acetate, then with acetone, and dried in air at about 60°C. A yield of 2.9 g. of fibers is obtained, representing a weight gain of only about 4 percent, indicating that only about 10 percent of the phenolic hydroxyl groups in the resin are blocked. The resulting fibers are somewhat more orange than the starting fibers, but are just as intensely colored. However, when the high Cross-link density fibers are swelled by brief immersion in boiling dimethylformamide prior to the acetic anhydride treatment, a somewhat greater extent of esterification is achieved and the resulting fibers are light yellow.

Example 6 illustrates the difficulty of blocking the phenolic hydroxyl groups in highly cross-linked phenolic resin fibers, as well as the value of a liquid swelling agent as an aid in doing so. It also illustrates the lack of advantage of such extensive cross-linking with respect to the mechanical properties of the fibers. It is likely that increased time and/or temperature of acetylation, in addition to swelling the fibers, would result in a still further increase in the extent of acetylation, white fibers being produced. Nonetheless, ever the light yellow fibers produced in Example 6 represent an improvement over the more intensely colored starting fibers, being susceptible to dyeing in a wider range of hues.

As has been noted, infusible cured phenolic resin fibers wherein the resin has not been blocked become more intensely colored with age and exposure to light and air. Difficulty may be encountered in producing white fibers from such intensely colored aged fibers, but light yellow fibers having improved oxidation resistance and colorfastness may quite readily be obtained therefrom by blocking the phenolic hydroxyl groups in accordance with the invention.

Example 7

3.5 of cured novolac fibers produced as in Example 1 are immersed in 100 ml. of one normal aqueous sodium hydroxide solution at 60°C for 1 hour to replace the hydrogen atoms of the phenolic hydroxyl groups with sodium atoms, i.e., to produce what may be termed the sodium salt of the cured resin. The fibers are removed, washed with water and dried in air at about 60°C.

The fibers are immersed in 100 ml. of dimethyl sulfate at room temperature, and the temperature is raised to 80°C, where it is held for 1 hour. The fibers are removed, washed with acetone and dried in warm air. A yield of 3.8 g. of fibers is obtained, representing a weight gain of 9 percent, indicating that about 69 percent of the phenolic hydroxyl groups of the resin are blocked by etherification, i.e., methylation. The fibers are light tan, thus being dyeable in a wide range of hues. As compared to the starting cured novolac fibers, they have substantially improved oxidation resistance and colorfastness, and approximately the same tenacity and break elongation. White fibers may be obtained by optimizing the reaction conditions.

Example 8

A resole is prepared conventionally by condensing phenol with a two-fold molar excess of formaldehyde in the presence of a catalytic amount of sodium hydroxide. After removing the water by vacuum distillation and subsequently by freeze-drying, the resin has an average molecular weight of about 500. The resin is fiberized by melt spinning, filaments being drawn through orifices from a melt at 80°C and collected on a spindle. The white, fusible, uncured resole fibers have diameters ranging from 15 microns to 25 microns. The phenolic resin is cured by heating the fibers gradually from room temperature to 150°C over a period of 50 hours. The resulting infusible, cured, cross-linked resole fibers are rather dark reddish-pink. They have a tenacity ranging from about 1 g./denier to about 2 g./denier and a break elongation ranging from about 1 percent to about 10 percent.

1.00 g. of the fibers are immersed for 30 minutes in a boiling (about 120°C) mixture of 100 ml. of acetic anhydride, 100 ml. of dimethylacetamide, 100 ml. of tetrachloroethylene and 0.1 ml. of 98% sulfuric acid. The fibers are removed, washed with acetone, then with water, and dried in air at about 60°C.

A yield of 1.25 g. of fibers is obtained, representing a weight gain of 25 percent, indicating that at least about 64 percent of the phenolic hydroxyl groups in the resin are blocked by esterification. The fibers are markedly whitened as compared to the unesterified resin fibers, but have approximately the same tenacity and break elongation. Their colorfastness and oxidation resistance are improved as compared to the unesterified resin fibers, being comparable to the esterified phenolic resin fibers of Example 1.

It will be apparent to those skilled in the art that any of an extremely wide variety of esterification and etherification reagents may be employed to effect blocking of the phenolic hydroxyl groups instead of the much preferred reagents employed in the examples. Considering esterification, it is preferred to replace the hydrogen atoms of the phenolic hydroxyl groups with lower acyl groups, preferably acetyl groups. Accordingly, the anhydrides of lower alkanoic acids are preferred acylation reactants, such as propionic anhydride, the butyric anhydrides and the like, and most preferably acetic anhydride, as well as mixed anhydrides of the lower alkanoic acids. Cyclic anhydrides of dicarboxylic lower aliphatic acids are also useful, and halogenated lower acyl blocking groups may be introduced by the use of anhydrides of halogenated lower alkanoic acids such as chloroacetic anhydride and the like. Acid halides, preferably chlorides, of lower alkanoic acids are also preferred acylation reagents, such as propionyl chloride, n- and iso-butyryl chlorides and the like, and most preferably acetyl chloride. Halogenated lower acyl blocking groups may be introduced with acid halides of halogenated lower alkanoic acids such as chloroacetyl chloride, 2- and 3-chloropropionyl chlorides and the like. Benzoyl chloride may be conveniently used to introduce benzoyl blocking groups, benzoyl chlorides having halogen and/or lower alkyl ring substituents also being useful reactants. Acid chlorides of aromatic dicarboxylic acids, with or without halogen and/or lower alkyl ring substituents, are also useful, especially phthaloyl chloride, isophthaloyl chloride and terephthaloyl chloride. The latter two substances are unique in that they are capable of effecting further cross-linking of the resin by forming links between neighboring phenolic hydroxyl groups.

Considering etherification, it is preferred to replace the hydrogen atoms of the phenolic hydroxyl groups with lower alkyl groups, preferably methyl groups. Diethyl sulfate, and particularly dimethyl sulfate, are preferred alkylation reagents, diazomethane and aziridines such as methyl aziridine also being useful. Lower alkyl halides are also useful, the iodides being more reactive than the bromides, which in turn are more reactive than the chlorides. Accordingly, halogenated lower alkyl blocking groups may be introduced, for example, with bromine-containing, chlorine-containing, and/or fluorine-containing lower alkyl iodides. Epoxidized alkyl halides such as epichlorohydrin may also be used. Phenyl halides, with or without lower alkyl ring substituents, may also be employed in accordance with the same principles. As with dimethyl sulfate, when using alkyl halides or phenyl halides, faster reactions are generally obtained if the cured resin is first converted to its sodium salt, as in Example 7. There is also some indication that various aldehydes may react to form certain types of ethers, such as acetals, especially if the resin contains ortho-hydroxyl groups as do resins prepared, for example, from catechol.

It will be apparent that the improved fibers of the invention may be in the form of as staple, continuous filaments, continuous multifilament yarn and the like, which may be processed conventionally into various textile products such as those mentioned hereinbefore having, in general, the same wide range of utilities as similar products produced from unblocked phenolic resin fibers.

Molecular weights of phenolic resins as mentioned herein refer to number-average molecular weights, being determined by vapor phase osmometry.

Viscosity has been set forth herein in centipoises (cps.), originally being determined as apparent viscosity in lb. sec./in.$^2$ with a Model G-1 D&R Melt Indexer and then converted to centipoises by multiplying by a factor of $6.88 \times 10^6$ as reported in the literature.

Percentages referred to herein are percentages by weight except as otherwise expressly stated or indicated by the context, such as with respect to the proportion of phenolic hydroxyl groups blocked in accordance with the invention.

While the invention has been described herein with reference to certain examples and preferred embodiments, it is to be understood that various changes and modifications may be made by those skilled in the art without departing from the concept of the invention, the scope of which is to be determined by reference to the following claims.

We claim:

1. An infusible cured phenolic resin fiber having improved oxidation resistance and colorfastness wherein at least about 50 percent of the phenolic hydroxyl groups of said resin are blocked by monovalent radicals having the formula R — or

R being selected from the group consisting of lower alkyl, lower alkyl wherein one or more hydrogen atoms are replaced by halogen, phenyl, and phenyl wherein one or more hydrogen atoms are replaced by a halogen or lower alkyl.

2. A fiber as set forth in claim 1 wherein at least about 90 percent of the phenolic hydroxyl groups are blocked.

3. A fiber as set forth in claim 1 wherein said phenolic hydroxyl groups are blocked by esterification.

4. A fiber as set forth in claim 2 wherein said phenolic hydroxyl groups are blocked by esterification.

5. A fiber as set forth in claim 3 wherein said phenolic hydroxyl groups are blocked by replacement of the hydrogen atoms of said groups with lower acyl groups.

6. A fiber as set forth in claim 5 wherein said acyl groups are acetyl groups.

7. A fiber as set forth in claim 6 wherein at least about 90 percent of said phenolic hydroxyl groups are blocked.

8. A fiber as set forth in claim 6 wherein substantially all of said phenolic hydroxyl groups are blocked.

9. A fiber as set forth in claim 1 wherein said phenolic hydroxyl groups are blocked by etherification.

10. A fiber as set forth in claim 9 wherein said phenolic hydroxyl groups are blocked by replacement of the hydrogen atoms of said groups with lower alkyl groups.

11. A fiber as set forth in claim 10 wherein said alkyl groups are methyl groups.

12. A fiber as set forth in claim 1 which is white.

13. A fiber as set forth in claim 3 which is white.

14. A fiber as set forth in claim 5 which is white.

15. A fiber as set forth in claim 6 which is white.

16. A fiber as set forth in claim 11 which is white.

17. A fiber as set forth in claim 1 wherein said cured phenolic resin is a cured novolac.

18. A fiber as set forth in claim 17 wherein said cured novolac is a cured resin condensation product of phenol and formaldehyde.

19. A method for the production of a fiber as set forth in claim 1 comprising reacting an infusible cured phenolic resin fiber with an esterification or etherification reagent selected from the groups consisting of anhydrides of lower alkanoic acids, dimethyl sulfate and diethyl sulfate in a liquid environment at a temperature and for a time sufficient to block at least about 50 percent of the phenolic hydroxyl groups of said resin.

20. A method as set forth in claim 19 wherein said reagent is dimethyl sulfate and said resin is converted to the sodium salt prior to said reacting.

21. A method as set forth in claim 19 wherein said reagent is acetic anhydride and said temperature is at least about 100°C.

22. A method as set forth in claim 21 wherein a catalytic amount of a mineral acid is present in said liquid environment.

23. A method as set forth in claim 21 wherein said infusible cured phenolic resin fiber is swelled with a polar liquid.

24. A method as set forth in claim 21 wherein said liquid environment comprises an inert liquid.

* * * * *